(No Model.)

J. E. BERKSTRESSER.
HORSE DETACHER.

No. 531,015. Patented Dec. 18, 1894.

Witnesses
H. Alber
J. B. Earle

Inventor
John E. Berkstresser
By his Attorney P. Byrne

THE NORRIS PETERS CO., PHOTO-LITHO., WASHINGTON, D. C.

UNITED STATES PATENT OFFICE.

JOHN EMORY BERKSTRESSER, OF SYLACAUGA, ALABAMA.

HORSE-DETACHER.

SPECIFICATION forming part of Letters Patent No. 531,015, dated December 18, 1894.

Application filed February 12, 1894. Serial No. 499,904. (No model.)

*To all whom it may concern:*

Be it known that I, JOHN EMORY BERKSTRESSER, a citizen of the United States, residing at Sylacauga, in the county of Talladega and State of Alabama, have invented certain new and useful Improvements in Kicking-Straps, Breechings, and Horse-Detachers; and I do hereby declare the following to be a full, clear, and exact description of the invention, such as will enable others skilled in the art to which it appertains to make and use the same.

My invention relates to improvements in that class of devices known as a combined kicking strap, breeching, and horse detacher; and the objects of my improvement are, first, to provide a kicking strap to be attached to the shafts of a vehicle, that will effectively prevent a horse from getting his legs over the strap to injure the occupants of the vehicles, the strap also acting as a breeching, to prevent the vehicle running on the horse when going down grade; second, to provide a simple and cheaply constructed device secured to the shafts, to which the traces are attached, having lines from levers to the vehicle, by which the horse can be detached, or let loose from the vehicle when necessary, and, third, to provide the kicking strap and traces with coiled springs. The springs when a strain comes on them, will give to a certain extent lessening the jar or shock, and making the movements of the vehicle much easier on the horse. I attain these objects by the mechanism and the arrangement of the different parts illustrated in the accompanying drawings, in which—

Figure 1:
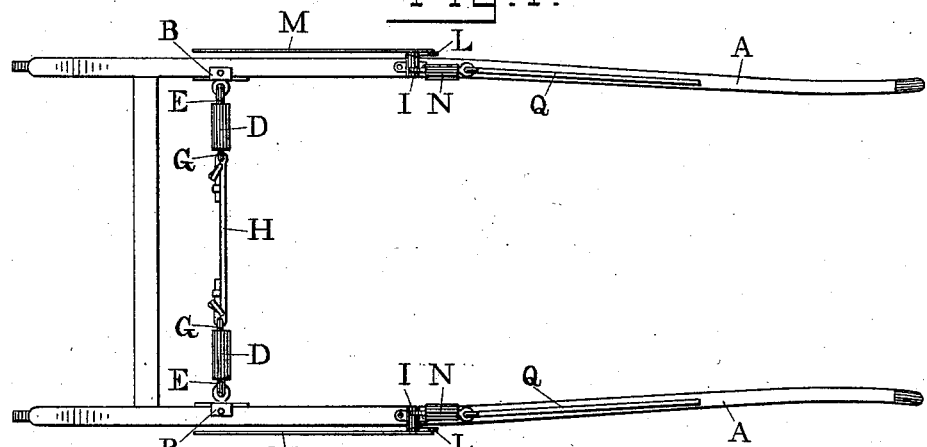
Figure 2:
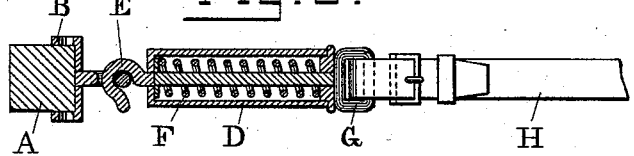
Figure 3:
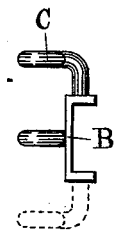
Figure 5:
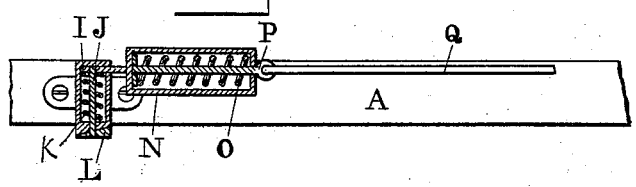
Figure 4:
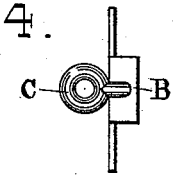
Figure 6:
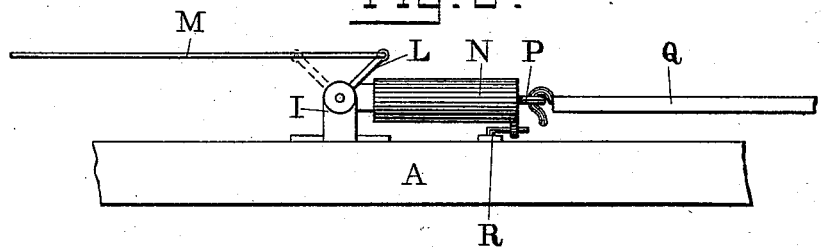

Figure 1, is a top view of a pair of shafts with my devices attached. Fig. 2, is an enlarged vertical longitudinal sectional view through the center, of one of the springs and shaft attachments of the kicking strap and breeching. Fig. 3, is an enlarged vertical side view of the shaft attachment, showing an additional eye to be screwed in the top or bottom of the attachment, to adjust the strap to horses of different heights. Fig. 4, is a top view of same. Fig. 5, is an enlarged longitudinal sectional view through the center of the trace spring and detaching device. Fig. 6, is an enlarged vertical side view of the trace spring casing and horse detacher, showing them attached to part of a shaft.

Similar letters refer to similar parts throughout the several views.

The shafts A. A are of any of the usual forms, no special form or design being necessary. A metallic attachment B. B provided with an eye is attached to the shafts on both sides. This attachment is provided with an additional loose eye C, which can be attached to the top or bottom side if desired to raise or lower the position of the strap.

Metallic casings D. D provided with a hook E at one end, are hooked in the eyes of the shaft attachments. The casings are provided inside with coiled springs F. A strap connection G is placed inside the spring having a washer on the inner end, and an eye formed on its outer end, to attach the strap H in the usual manner by passing the strap through the eye and securing the end with a buckle.

A metallic detaching device I. I is attached as shown to each shaft. They are provided with a trace pin J held to place by a coiled spring K. On the outer ends of the trace pins are secured levers L L having lines M M attached. The surface between the inside of the levers and the detaching devices, is made on an incline as shown. When the lever is drawn back the incline withdraws the trace pin from the trace, allowing the trace to be withdrawn from the detacher.

Metallic casings N N having a flat end with a hole for the trace pin to enter to connect the trace to the detacher are used on both sides as shown. The casings are provided inside with coiled springs O having a trace connecting rod P passing through the inside of the springs, the trace connection having a washer on the inner end, and an eye formed on the outer end, to which the traces Q Q are attached in the usual manner by hooks.

A guide pin R is attached to the shaft underneath the trace connection casing, and the casing is provided on the under side with a guide embracing the pin, to keep the casings from swinging from side to side when in use by the motion of the horse.

Having thus described my invention, what I claim as new, and desire to secure by Letters Patent, is—

1. The metallic attachments B. B secured to the shafts A. A having a detachable eye C adapted to be attached to the top or bottom of the attachments B, two metallic spring casings D. D provided with hooks E to engage the eyes of the attachments B, two spring pressed strap connections G. G having stems inserted in the casings, a strap H attached to the connection G. G, all combined as shown and for the purpose set forth.

2. The metallic detachers I. I secured to the shafts A. A the detachers provided with spring pressed bolts to engage the metallic casings N, the bolts J provided with levers L having lines M attached, guide pins R attached to the shafts the guide pins engaging the metallic casings N the casings provided with eyes P to attach the traces, all combined as shown and for the purpose described.

In testimony whereof I affix my signature in presence of two witnesses.

JOHN EMORY BERKSTRESSER.

Witnesses:
　CHAS. P. JONES,
　J. M. COTTEN.